(12) United States Patent
Wiaterek

(10) Patent No.: US 7,360,409 B2
(45) Date of Patent: Apr. 22, 2008

(54) DEVICE FOR DETECTING THE AMOUNT OF SPLASH WATER TO WHICH A BRAKE PAD IS SUBJECTED ON A WET ROADWAY

(75) Inventor: Christian Wiaterek, Odenthal (DE)

(73) Assignee: TMD Friction Services GmbH, Leverkusen (DE)

( * ) Notice: Subject to any disclaimer, the term of this patent is extended or adjusted under 35 U.S.C. 154(b) by 323 days.

(21) Appl. No.: 10/516,666

(22) PCT Filed: May 14, 2003

(86) PCT No.: PCT/EP03/05018

§ 371 (c)(1),
(2), (4) Date: Aug. 22, 2005

(87) PCT Pub. No.: WO03/102440

PCT Pub. Date: Dec. 11, 2003

(65) Prior Publication Data

US 2006/0180415 A1    Aug. 17, 2006

(30) Foreign Application Priority Data

May 31, 2002   (DE)   ............................ 102 24 552

(51) Int. Cl.
G01L 5/28   (2006.01)
(52) U.S. Cl. ...................................... 73/128
(58) Field of Classification Search .............. 73/7, 73/9, 128, 129
See application file for complete search history.

(56) References Cited

U.S. PATENT DOCUMENTS

| 4,427,976 | A | * | 1/1984 | Lord | ............. | 340/604 |
| 4,594,785 | A | * | 6/1986 | Carlson | ............. | 33/833 |
| 5,098,758 | A | * | 3/1992 | Kani | ............. | 428/37 |
| 5,239,486 | A | * | 8/1993 | Mortier | ............. | 702/184 |
| 6,220,404 | B1 | * | 4/2001 | Hara et al. | ............. | 188/251 A |
| 7,094,268 | B2 | * | 8/2006 | Krantz | ............. | 55/385.3 |
| 2001/0024917 | A1 | * | 9/2001 | Ogata et al. | ............. | 442/97 |
| 2005/0276961 | A1 | * | 12/2005 | Sherwood et al. | ............. | 428/292.1 |

FOREIGN PATENT DOCUMENTS

| EP | 0684215 | | 11/1995 |
| EP | 959262 A1 | * | 11/1999 |
| EP | 1179687 A1 | * | 2/2002 |

OTHER PUBLICATIONS

Web Document: Blau et al., "Effects of water films and sliding speed on the frictional behavior of truck disc brake materials" (Mar. 23, 2003) Science Direct.*

* cited by examiner

Primary Examiner—Hezron Williams
Assistant Examiner—John Fitzgerald
(74) Attorney, Agent, or Firm—Blakely Sokoloff Taylor & Zafman

(57) ABSTRACT

A device for detecting the amount of splash water to which a brake pad is subjected on a wet roadway. The device includes a test brake pad. whose friction lining is hygroscopically designed so that it can absorb at least 5%. preferably at least 10% water. In a test phase. vehicles can be easily tested by replacing their stock brake pads with test brake pads. By virtue of the fact that the inventive friction lining is hvgroscopic. a direct correlation exists between the water absorption of the friction lining and the amount of moisture led to the friction lining in the form of splash water and air humidity.

15 Claims, No Drawings

DEVICE FOR DETECTING THE AMOUNT OF SPLASH WATER TO WHICH A BRAKE PAD IS SUBJECTED ON A WET ROADWAY

The present patent application is a non-provisional application of International Application No. PCT/EP03/05018, filed May 14, 2003.

BACKGROUND OF THE INVENTION

1. Field of the Invention

The present invention relates to a device for determining the amount of splash water, to which a brake pad is subjected on a wet roadway and to a usage of the device.

2. Description of Related Art

It is important for brake pads that they exhibit stable frictional values, even in wet conditions. Water in the form of spray water basically has a negative effect on the frictional values of a brake pad. It has transpired that with unfavourable constructions of the vehicle and/or brakes, the braking distance of a vehicle in winter can increase by a factor of up to 2 under the influence not only of water but also of road salt. This is of crucial significance for the safety of traffic. Furthermore, the comfort performance and the corrosion of the vehicle are negatively influenced by an unnecessarily high supply of sprayed water.

BRIEF SUMMARY OF THE INVENTION

It is therefore the object of the present invention to provide a device of the type referred to above and a usage for this device.

In accordance with the invention, this object is solved by a device for determining the amount of splash water, to which a brake pad is subjected on a wet roadway, including a test brake pad, whose friction lining is hygroscopic such that it can absorb at least 5%, preferably at least 10%, water.

Substances which can withdraw the water vapour from a water vapour-gas mixture, eg. air, are termed hygroscopic. Hygroscopic substances also absorb water when in direct contact with water, for instance when in contact with splash water in the invention. The water can be absorbed either by hydration, wherein water molecules are accumulated at polar groups of molecules dissolved in the water on the basis of electrostatic ion-dipole interaction or by forming hydrogen bridge compounds. The absorbed water can be gently removed again by the supply of energy. This is referred to as drying. The process of water absorption and drying occurs in certain temperature ranges without molecular conversion or splitting and is thus reversible in these ranges. The test brake pads in accordance with the invention can thus be used repeatedly, when using suitable test conditions, if they are dried sufficiently in the meantime. The material costs can be limited to a minimum in this manner.

Surprisingly, it has transpired that complicated test structures for determining the flow conditions of the spray water are not necessary. The vehicles can be tested in a test phase simply by replacing their standard brake pads by test brake pads. Since the friction lining in accordance with the invention is hygroscopic, there is a direct connection between the water absorption of the friction lining and the amount of moisture supplied to the friction lining in the form of spray water and air humidity. The test brake pad in accordance with the invention thus permits a precise determination of the moisture supplied to the brakes. The amount of spray water, to which a brake pad is subjected on a wet roadway, may be determined from this supplied moisture, either with the aid of comparative measurements or by means of a computer. In the simplest case, the influence of the air humidity can be ignored. In this manner, the information necessary for optimisation of the vehicle construction, particularly of the underbody assembly and/or of the brakes as regards the supply of spray water can be obtained without particular effort and thus economically.

The above object is also solved in accordance with the invention by a use of the device in accordance with the invention, wherein
 a) the initial mass of the test brake pad is determined,
 b) the test brake pad is installed in a vehicle,
 c) the vehicle is subjected to predetermined operational conditions,
 d) the final mass of the test brake pad is then determined and
 e) the water absorption of the friction lining is determined from the difference between the initial mass and the final mass.

Particularly high precision in the determination of the water absorption can be achieved if the test brake pad is dried before step d). Water adhering to the surface of the test brake pad may thus be removed so that it does not enter into the determination of the final mass of the test brake pad. The drying is effected such that the water absorbed by the test brake pad is not expelled. There is thus a brief drying process. It is particularly advantageous to wash off the test brake pad with a low boiling point liquid. Acetone or ethanol, above all, are suitable for this purpose. These liquids remove the surface water and the subsequent drying process then serves only to vaporise the washing liquid. The energy input necessary for this purpose is too low to expel the water absorbed by the test brake pad.

DETAILED DESCRIPTION OF THE INVENTION

The steps a) to e) are advantageously performed for all brake pads of a vehicle. Problems with splash water generally occur more at the inner brake pads of vehicles than at the outer pads. As a result of the determination of the water absorption of all brake pads of a vehicle, the vehicle construction or the brake construction can be optimised substantially better, more rapidly and more economically.

A preferred exemplary embodiment is characterised in that a threshold value is determined for the water absorption and the construction of the vehicle and/or brakes is altered when the water absorption determined in step e) is greater then the threshold value.

The test brake pad in accordance with the invention is advantageously characterised in that the friction lining contains at least 15 vol. %, preferably at least 17 vol. %, hygroscopic bonding agent. The hygroscopic property of the friction lining can be achieved without difficulty by means of a substantially higher content of bonding agents in comparison to the prior art without special additives being required or mechanical treatment of the friction lining being necessary to achieve a porous body. The bonding agent can be selected at will in dependence on the desired manufacturing process, for instance with or without scorching. Resins (unmodified or organically or inorganically modified) are generally used as the bonding agent. Of the organic modifications, the cresol, alkyl, CSNL, epoxide, NBR, resorcinol, aryl, SBR and CR modifications have proved to be particularly satisfactory and of the inorganic modifications, the boron, phosphorus, silicone and chromium modifications have proved to be particularly satisfactory.

It has proved to be satisfactory if the friction lining is free of lubricant and, in particular, contains no sulphides or graphite. One embodiment of the invention is characterised in that the friction lining is additionally or alternatively free of abrasive agent and, in particular, contains no $Al_2O_3$, no Zr silicate and no SiC.

The term abrasive agents is to be understood in this case as abrasive frictional particles in the classical sense. It has transpired that a friction lining free of lubricant and free of abrasive agent is particularly suitable for testing the vehicle construction as regards the supply of splash water since it can not only be adjusted to be appropriately hygroscopic but also exhibits excellent frictional characteristics.

It is proposed in a further embodiment of the invention that the friction lining contains 8 vol. % to 12 vol. %, preferably 10 vol. % fibres.

The friction lining preferably contains aramide fibres and/or polyacrylonitrile fibres as the fibres. Aramide fibres, which already contain up to 5% water, can be used in order to reduce the electrostatic charge. These are able, under ideal conditions, permanently to store more than 15% water.

A preferred exemplary embodiment is characterised in that the friction lining contains
  6 vol. % to 14 vol. %, preferably 10 vol. %, fibres,
  5 vol. % to 13 vol. %, preferably 9 vol. %, rubber,
  13 vol. % to 21 vol. %, preferably 17 vol. %, bonding agent,
  10 vol. % to 18 vol. %, preferably 14 vol. %, amorphous quartz,
  1 vol. % to 9.5 vol. %, preferably 5.5 vol. %, mica,
  10.5 vol. % to 18.5 vol. %, preferable 14.5 vol. %, magnesium-aluminium silicate,
  5.5 vol. % to 13.5 vol. %, preferably 9.5 vol %, potassium titanate,
  6.5 vol. % to 14.5 vol. %, preferably 10.5 vol. %, steel wool, and
  6 vol. % to 14 vol. %, preferably 10 vol. %, aluminium hydrosilicate Both expanded and non-expanded mica can be used as the mica. Potassium titanate can be included in the firm of fibres or in powder form. The steel wool is for the purpose of mechanical strength. It is inherently non-hygroscopic.

For test purposes, an appropriate friction lining was stored at 95% air humidity. It transpired that the material absorbed 3.4% water after only 2 days, 5.8% after 5 days, 10.2% after 14 days, 13.4% after 35 days and 15% after 49 days. This slow, continuous increase in the water absorption is optimal for detecting the amount of spray water to which a brake pad is subjected on a wet roadway, since the friction pad can not immediately achieve its maximum water absorption in the test phase, when it comes into contact with water. On the other hand, the water absorption should not occur too slowly since the test phase should not exceed reasonable time limits. This is possible without difficulty with the aforementioned composition. Furthermore, a test brake pad with a friction pad of this composition exhibits stable frictional values of between $\mu=0.3$ and 0.4 under frictional testing. The cold frictional value of $\mu=0.4$ is also very favourable and higher than with many mass produced materials. Even emergency braking from 100 and 180 km/h is stable. It is notable that such a test brake pad also has astonishingly short moment curves. Only at the first temperature fading, namely when the final temperature rises to 600° C., does the frictional value drop significantly. Overall, a test brake pad with a friction pad of the aforementioned composition has frictional characteristics comparable to the known, less hygroscopic, mass produced materials under temperature loading of up to ca. 400° C. Under the braking procedures performed in the test phase, account need consequently not be taken of the particular material characteristics of the test brake pad which is used. The operational conditions, to which the vehicle is subjected in the test phase, can therefore be selected to be as realistic as possible.

A further advantage of the aforementioned composition is that a corresponding test brake pad results in no perceptible noise and, in particular, has a very good squeaking behavior.

A hygroscopic rubber is preferably used as the rubber for reasons of compressibility. The friction pad preferably contains acrylonitrile—butadiene rubber as the rubber.

The automobile manufacturers and/or brake manufacturers can develop remedial measures to reduce the supply of splash water on the basis of the amount of splash water, to which a brake pad is subjected on a wet roadway and which may be detected with the test brake pad in accordance with the invention. They can alter the construction of the vehicle or of the brakes or incorporate additional elements, for instance protective shields or deflecting spoilers. The braking distance can be shortened under wet conditions in this manner and the safety of the vehicle and thus of the traffic can be significantly increased. At the same time, corrosion is reduced. Numerous developments are possible within the scope of the inventive concept. The friction lining can be as strongly hygroscopic as desired. The composition of the friction pad can also be altered as desired, provided that a minimum amount of frictional properties remains. Instead of determining the initial mass and the final mass of the test brake pad, the corresponding initial volume and final volume can also be determined.

The invention claimed is:

1. A device for detecting the amount of splash water, to which a brake pad is subjected on a wet roadway, said device comprising a test brake pad, said test brake pad having a hygroscopic friction lining which is able to absorb at least 5% water.

2. The device of claim 1, wherein the friction lining can absorb at least 10% water.

3. The device of claim 1, wherein said friction lining contains at least 15vol. % of a hygroscopic bonding agent.

4. The device of claim 1, wherein said friction lining is free of lubricant and contains no sulphides or graphites.

5. The device of claim 1, wherein said friction lining is free of abrasive agents.

6. The device of claim 1, wherein said friction lining contains no $Al_2O_3$, no Zr silicate and no SiC.

7. The device of claim 1, wherein said friction lining contains 8vol. % to 12vol. % fibres.

8. The device of claim 7, wherein said friction lining contains 10vol. % fibres.

9. The device of claim 7, wherein said friction lining contains aramide fibres and/or polyacrylonitrile fibres.

10. The device of claim 1, wherein said friction lining contains
  6vol. % to 14vol. % fibres,
  5vol. % to 13vol. % rubber,
  13vol. % to 21vol. % bonding agent,
  10vol. % to 18vol. % amorphous quartz,
  1vol. % to 9.5vol. % mica,
  10.5vol. % to 18.5vol. % magnesium-aluminium silicate,
  5.5vol. % to 13.5vol. % potassium titanate, 6.5vol. % to 14.5vol. % steel wool, and 6.vol. % to 14vol. % aluminium hydrosilicate.

11. The device of claim 10, wherein said friction lining contains acrylo nitrile-butadiene rubber.

12. A method for determining the amount of splash water, to which a brake pad is subjected on a wet roadway, by means of a device comprising a test brake pad, said test brake pad having a hygroscopic friction lining which is able to absorb at least 5% water, said method comprising:
   a) determining an initial mass of the test brake pad,
   b) installing the test brake pad into a vehicle,
   c) subjecting the vehicle to predetermined operating conditions,
   d) determining the final mass of the test brake pad and
   e) determining the water absorption of the friction lining from the difference between the initial mass and the final mass.

13. The method of claim 12, wherein the test brake pad is dried before step d).

14. The method of claim 12, wherein steps a) to e) are performed for all the brake pads of a vehicle.

15. The method of claim 12, wherein a threshold value is established for the water absorption and the construction of the vehicles and/or brakes is altered when the water absorption in step e) is greater than the threshold value.

* * * * *

UNITED STATES PATENT AND TRADEMARK OFFICE
CERTIFICATE OF CORRECTION

PATENT NO. : 7,360,409 B2  Page 1 of 1
APPLICATION NO. : 10/516666
DATED : April 22, 2008
INVENTOR(S) : Wiatarek It is certified that error appears in the above-identified patent and that said Letters Patent is hereby corrected as shown below:

On Title Page
In item [12], please delete "Wiaterek" and insert -- Wiatarek --.
In item [75], please delete "Wiaterek" and insert -- Wiatarek --.

On Title Page
In item [57], the abstract, line 3, please delete "pad." and insert -- pad, --.
In item [57], the abstract, line 4, please delete "5%." and insert -- 5%, --.
In item [57], the abstract, line 5, please delete "phase." and insert -- phase, --.
In item [57], the abstract, line 8, please delete "hvgroscopic." and insert
-- hyrogospic, --.

Signed and Sealed this

Twelfth Day of May, 2009

JOHN DOLL
*Acting Director of the United States Patent and Trademark Office*